Dec. 6, 1960  C. R. STOUGH  2,963,317
ADJUSTABLE TREAD WHEEL AND RIM CLAMP THEREFOR
Filed Jan. 6, 1958  3 Sheets-Sheet 1

INVENTOR.
CHARLES R. STOUGH
BY
Barnes, Kisselle, Raisch & Choate
ATTORNEY

INVENTOR.
CHARLES R. STOUGH
BY
Barnes, Kisselle, Raisch & Choate
ATTORNEY

United States Patent Office 2,963,317
Patented Dec. 6, 1960

2,963,317

ADJUSTABLE TREAD WHEEL AND RIM CLAMP THEREFOR

Charles R. Stough, Lansing, Mich., assignor to Motor Wheel Corporation, Lansing, Mich., a corporation of Michigan Filed Jan. 6, 1958, Ser. No. 707,348

3 Claims. (Cl. 301—9)

This invention relates to an adjustable tread wheel and a clamp member for securing the wheel rim to the wheel body.

Wheels designed so that the rim thereof can be adjusted in an axial direction are old. See, for example, United States Patent No. 2,417,139, to Strehlow, dated March 11, 1947, and my prior Patent No. 2,793,913, dated May 28, 1957. The present invention is directed to an improvement over the wheel structure and rim clamping means shown in these prior patents.

One object of the present invention is to secure a tractor wheel disc to a helical rail type of adjustable rim by means of a rim clamp which can be made as an inexpensive one-piece casting that requires no machining or close tolerances with cooperating parts.

Another object of the invention is to provide a clamp which will hold the rim in place securely when tightened to the wheel body and yet is easily loosened when adjustment of the rim is desired.

A further object of the invention is to provide a rim clamp which can be used on both a cast metal wheel body and a stamped metal wheel body and which will not bind or cock when it is tightened.

A still further object of the invention is to provide an adjustable tread type wheel and rim clamping device therefor that is of economical manufacture and which is designed to enable ready and quick adjustment of the rim in a direction axially of the wheel body.

Figure 1:
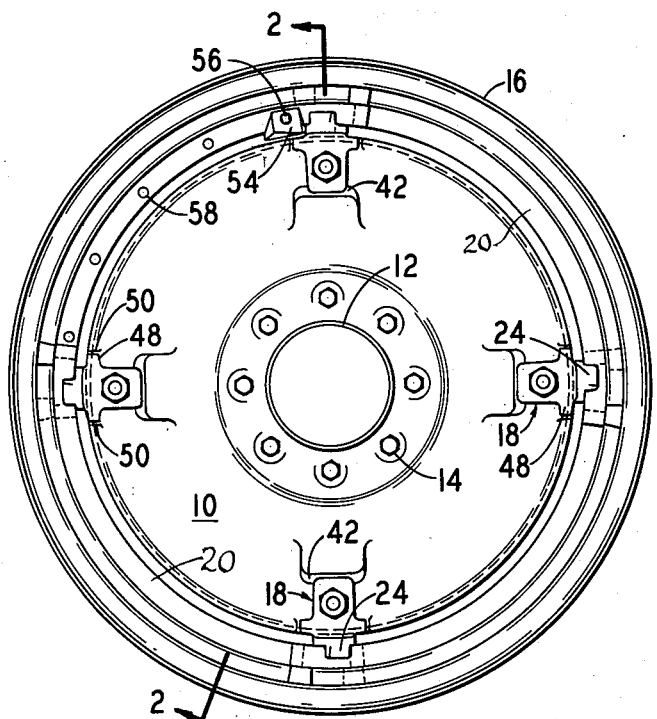
Fig. 1 is a front elevational view of the adjustable tread wheel of this invention utilizing a stamped wheel disc.

The wheel illustrated in the drawings includes a central disc 10 that is mounted on a wheel hub 12 by means of bolts 14. The wheel includes an outer rim 16 which is mounted on disc 10 for axial adjustment by means of clamps 18. Rim 16 has a plurality of circumferentially extending helical rails 20 thereon. In the wheel shown, four such rails are employed. The helical extent of each rail 20 approximates the full width of rim 16, each rail having inwardly turned ends 22 secured to the inner peripheral surface of rim 16.

Figure 2:
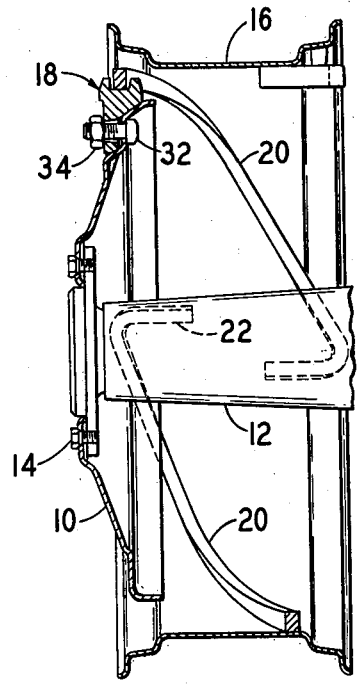
Fig. 2 is a sectional view along the lines 2—2 in Fig. 1.
Figure 3:
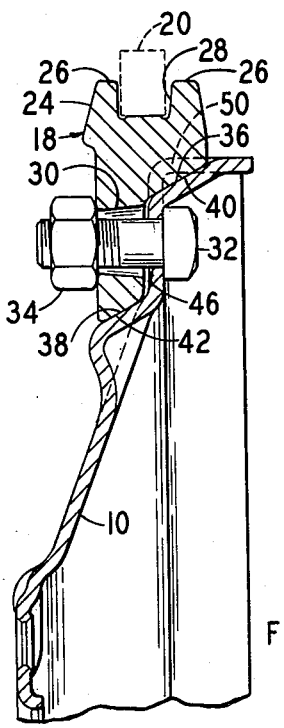
Fig. 3 is an enlarged fragmentary view of Fig. 2.
Figure 4:
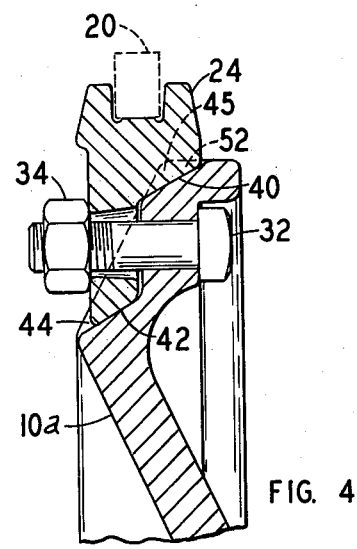
Fig. 4 is a view similar to Fig. 3 and showing the clamp of the present invention used on a cast wheel disc.
Figure 5:
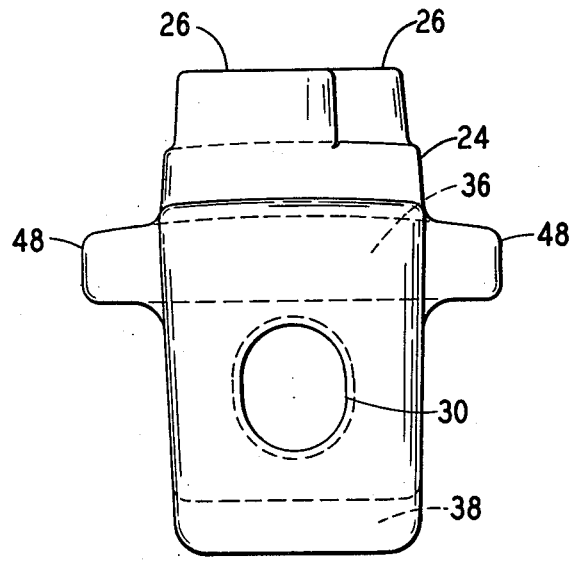
Fig. 5 is a front elevational view of the clamp.
Figure 6:
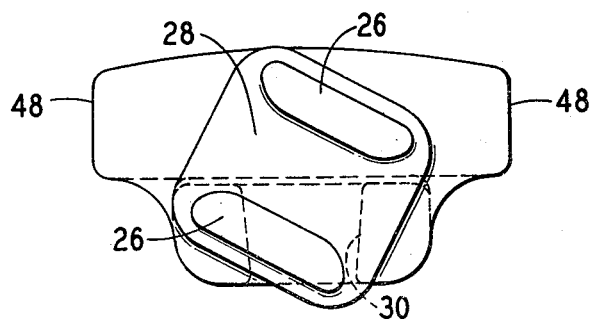
Fig. 6 is a top view of the clamp.
Figure 7:
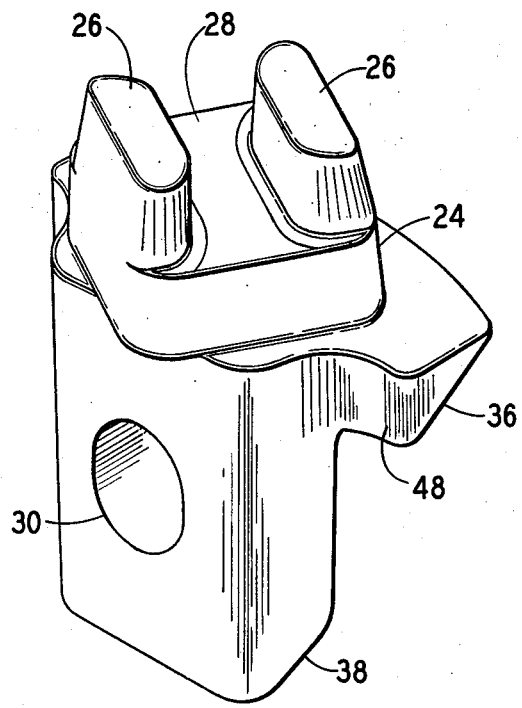
Fig. 7 is a perspective view of the clamp.

As is shown in Figs. 5 through 7, clamp 18 comprises a one-piece casting, the upper end of which comprises a yoke portion 24 having upstanding lugs 26 defining a slot 28 therebetween for engagement with the rails 20. The lower portion of each clamp 18 includes a vertically elongated hole 30 for receiving a bolt 32 provided with a nut 34 at the outer end thereof. Clamp 18 has a pair of cam faces 36 and 38, which are parallel and inclined in a direction radially outwardly and axially inwardly when arranged on the wheel. The cam face 36 is located above the bolt hole 30 and the cam face 38 is located below the hole 30. These cam faces are arranged to engage similarly inclined parallel ramp faces 40 and 42 formed on the wheel disc. In the case of a stamped wheel disc such as shown in Figs. 1, 2 and 3, the ramp faces 40, 42 are formed as radially spaced indentations pressed into the disc, the ramp faces 42 projecting outwardly from the front face of the disc. In the case of a cast wheel disc such as shown at 10a in Fig. 4, these ramp faces 40, 42 are cast in the wheel disc, the ramp faces 42 in this case forming the radially inner faces of sockets 44 and the ramp faces 40 forming the radially inner faces of sockets 45 on the outer face of the disc. Intermediate the ramp faces 40, 42 of each pair, the disc is provided with an opening 46 for receiving bolts 32.

The slot 28 between the spaced lugs 26 has its axis inclined to the plane of the lower portion of clamp 18 (Fig. 6) so that when the clamps are located on the wheel disc as shown with the cam faces 36, 38 engaging the ramp faces 40, 42, grooves 28 have their axes inclined axially to correspond with the axial inclination of the helical rails 20.

With this arrangement, it will be observed that when the clamps 18 are seated on the ramp faces 40, 42 of the wheel disc with the yokes 24 thereof engaged with the rails 20 and the nuts 34 are tightened on the bolts 32, the clamps 18 are drawn inwardly against the outer face of the wheel disc. As the clamps move inwardly, the cam faces 36, 38 ride up the parallel ramp faces 40, 42 of the wheel disc and tightly engage the rails 20. The nuts 34 are tightened sufficiently so that the clamps 18 distort or chord the rails 20 an amount found by experience to be sufficient to hold the rim against turning in use. For example, with a wheel having a diameter of say 30" to 36", a radial distortion or chording of about 3/32" of each rail 20 has been found to be sufficient to securely hold the rim against turning on the wheel disc.

As is the case with other forms of helical rail clamps, slippage of the rim on the rails may be further prevented by means of stop lugs 54 which are fastened to at least one of the rails 20 by screws 56 threaded into holes 58 in the rail. Where, as is illustrated in Fig. 1, the clamps 18 are at one extremity of the rails 20, only one stop lug 54 need be employed. If the clamps 18 are adjusted in a position intermediate the ends of rails 20, then two lugs 54 would be employed, one at each side of the clamp.

The actual procedure adopted for assembling the disc 10 to the rim may vary. One convenient way of assembling the disc to the rim is to support the rim in a horizontal position at several points around its periphery with its outer side facing downwardly and then position the four clamps one on each of the rails 20 in their approximate circumferentially spaced locations. The disc 10 is then lowered over the clamps and the bolt holes 30, 46 are aligned. The bolts 32 are then dropped through the aligned holes and the nuts 34 are threaded thereon. Thereafter, the nuts 34 are tightened to chord the rails as previously described.

In order to prevent rotation of the clamps 18 when the nuts 34 are tightened or the rim is adjusted, each clamp is provided with a pair of wing extensions 48 at the lateral edges of the clamps. In the case of the stamped wheel disc illustrated in Figs. 1, 2 and 3, these extensions are seated within indentations 50 pressed into the disc adjacent the opposite radial edges of ramp faces 40. In the case of a cast wheel disc such as shown in Fig. 4, these wing extensions 48 nest between the side walls 52 of the sockets 45. The interengagement of the clamps 18 with the disc positively prevents the clamps from rotating when the loosened clamps are moved along the rails 20 during axial adjustment of the rim.

When it is desired to move the rim axially of the wheel disc, the clamp nuts 34 are loosened so that the clamps 18 move radially inwardly of the engaged rails sufficiently to provide a slight clearance between the radially inner face of each rail and the base of groove 28. The stop lug 54 is then removed from the rail and replaced at a point on the rail corresponding to the axial displacement desired. With the tire of the wheel contacting the ground, the hub 12 and the disc 10 are turned by engine power, causing the clamps 18 to move along the rails until the stop lug 54 is reached. The clamp nuts 34 are again tightened to chord the rails 20 and thus effectively lock the rim in the newly adjusted position on the wheel disc.

Thus, it will be seen that the clamp of the present invention provides a simple but effective one-piece member for adjustably securing a rim of the helical rail type on a wheel disc. The provision of the two parallel cam faces 36, 38 which ride on the parallel ramp faces 40, 42 insures against cocking or tilting of the clamps in an axial direction so as to bind on the side faces of the rails 20 during tightening or loosening of the nuts 34 or during movement of the clamps along the rails during adjustment. These parallel mating surfaces on the clamp and wheel disc insure the maintenance of the angle of the clamp relative to the rail and the fastening nut and bolt as the clamp "rides" up and down the ramp faces 40, 42 and thus prevent binding on either the edges of the rail or on the bolt or nut which might otherwise occur if the clamp were permitted to tilt.

I claim:

1. In an axially adjustable tread wheel structure, the combination of a rim having a plurality of circumferentially extending helical rails on the inner surface thereof, a wheel disc having a plurality of circumferentially spaced pairs of radially inclined parallel ramp faces thereon, means adjacent the opposite edges of said ramp faces forming opposed abutments, the ramp faces in each pair being spaced radially and axially from one another, a clamp for each pair of said ramp faces, each clamp having at the axially inner side thereof a pair of parallel cam faces thereon spaced and inclined similarly to said ramp faces and engaged therewith, said clamps having radial side portions thereof nested between said opposed abutments on the wheel disc for preventing turning movement of the clamps on the wheel disc, the radially outer end of each clamp comprising a yoke having a groove therein forming an elongated seat in which one of said rails is engaged and, means for drawing said clamps axially toward said ramp faces to cause the clamps to move radially outwardly and thereby cause said yokes to chord said rails, said yoke being located axially generally between said cam faces with the longitudinal axis of the groove inclined to said cam faces to correspond with the helical shape of said rails.

2. The combination called for in claim 1 wherein said disc is provided with a plurality of circumferentially spaced sockets in the outer face thereof, said ramp faces comprising radially inner faces of said sockets.

3. The combination called for in claim 2 wherein said abutments comprise side wall portions of said sockets.

References Cited in the file of this patent

UNITED STATES PATENTS

| | | |
|---|---|---|
| 1,258,676 | Hargraves | Mar. 12, 1918 |
| 1,812,338 | Holt | June 30, 1931 |
| 2,154,035 | Cuddeback et al. | Apr. 11, 1939 |
| 2,793,913 | Stough | May 28, 1957 |

FOREIGN PATENTS

| | | |
|---|---|---|
| 755,301 | Great Britain | Aug. 22, 1956 |